US006726891B2

United States Patent
Sakatani et al.

(10) Patent No.: US 6,726,891 B2
(45) Date of Patent: Apr. 27, 2004

(54) TITANIUM OXIDE PRODUCTION PROCESS

(75) Inventors: Yoshiaki Sakatani, Niihama (JP); Hironobu Koike, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/820,367

(22) Filed: Mar. 29, 2001

(65) Prior Publication Data

US 2003/0068268 A1 Apr. 10, 2003

(30) Foreign Application Priority Data

Jul. 31, 2000 (JP) ........................................ 2000-230779
Dec. 21, 2000 (JP) ........................................ 2000-388333

(51) Int. Cl.⁷ .......................................... C01G 23/047
(52) U.S. Cl. ........................................ 423/609; 423/610
(58) Field of Search ................................ 423/609, 610, 423/611, 612

(56) References Cited

U.S. PATENT DOCUMENTS

| 3,211,528 A | | 10/1965 | Wigginton | .................... | 23/202 |
| 3,518,053 A | | 6/1970 | Kolznak et al. | ............... | 23/202 |
| 5,011,674 A | | 4/1991 | Yoshimoto et al. | | |
| 5,536,448 A | * | 7/1996 | Takahashi et al. | .......... | 423/610 |

FOREIGN PATENT DOCUMENTS

| EP | 0 371 329 A2 | 6/1990 |
| EP | 0 638 515 A2 | 2/1995 |
| EP | 1 125 636 A1 | 8/2001 |
| GB | 846085 | 8/1960 |
| SU | 783234 | 11/1980 |
| SU | 983059 | * 12/1982 |
| WO | WO 99/41200 | 8/1999 |
| WO | WO 99/43616 | 9/1999 |
| WO | WO 01/56928 A1 | 8/2001 |

OTHER PUBLICATIONS

Shinri Sato, "Photocatalytic Activity of $NO_x$–Doped $TiO_2$ In The Visible Light Region", *Chemical Physics Letters*, vol. 123, No. 1,2, Jan. 3, 1986, pp. 126–128.

E. Kanezaki et al., "Solid–state Chemistry of Thermally Induced Yellow Colouring in Synthetic Hydrous Titanium Oxide from $TiCl_3$", *J. Chem. Soc. Faraday Trans.*, vol. 88, No. 24, 1992, pp. 3583–3586, no month.

* cited by examiner

*Primary Examiner*—Steven Bos
(74) *Attorney, Agent, or Firm*—Sughrue Mion, PLLC

(57) ABSTRACT

A process for producing a titanium oxide is provided which comprises the steps of (i) reacting a titanium compound with ammonia in an amount exceeding the stoichiometric amount necessary to convert the titanium compound to a titanium hydroxide or reacting a titanium compound with a base at pH of from about 2 to about 7, to obtain a reaction product and (ii) calcining the obtained product. The titanium oxide exhibits a high photocatalytic activity by visible light radiation.

18 Claims, No Drawings

TITANIUM OXIDE PRODUCTION PROCESS

FIELD OF THE INVENTION

The present invention relates to a process for producing titanium oxide. Specifically, the present invention relates to a process for producing titanium oxide suitable for use for a photocatalyst.

BACKGROUND OF THE INVENTION

It has been investigated that malodorous substances in air are removed and that window glass and driveway walls are cleaned by a photocatalytic activity shown by titanium oxide. Recently, a decomposition and removal method using visible light as a light source has been drawing attention owing to the wide usability and the convenience and, therefore, titanium oxide exhibiting a high photocatalytic activity by irradiation of visible light has been developed.

Although a variety of processes as a method for producing such a titanium oxide have been proposed, there are problems for the production such that a specific apparatus equipped with a vacuum container is required and that the obtained titanium oxide is insufficient in the photocatalytic activity. The above-described problems especially become obstacles when a titanium oxide having a small particle size is needed, for example, when the titanium oxide is used by being uniformly applied to automotive materials or construction materials such as window glass and driveway walls.

SUMMARY AND OBJECTS OF THE INVENTION

One of the purposes in the present invention is to provide a process for easily producing a titanium oxide showing a high photocatalytic activity by visible light radiation without using a specific apparatus equipped with a vacuum container. Preferably, the purpose of the present invention is to provide a process for easily producing a titanium oxide having a small particle size.

Inventors of the present invention have investigated the process for producing titanium oxide and completed the present invention.

That is, the present invention provides a process for producing a titanium oxide which comprises the steps of (i) reacting a titanium compound with ammonia in an amount exceeding the stoichiometric amount necessary to convert the titanium compound to a titanium hydroxide or reacting a titanium compound with a base at pH of from about 2 to about 7, to obtain a reaction product and (ii) calcining the obtained product.

DETAILED DESCRIPTION OF THE INVENTION

A titanium oxide in the present invention is produced by a process which comprises the steps of (i) reacting a titanium compound with ammonia in an amount exceeding the stoichiometric amount necessary to convert the titanium compound to a titanium hydroxide or reacting a titanium compound with a base at pH of from about 2 to about 7, to obtain a reaction product and (ii) calcining the obtained product.

A titanium compound to be used for the present invention may be any titanium compound capable of producing a titanium hydroxide by reaction with a base and examples thereof are titanium trichloride ($TiCl_3$), titanium tetrachloride ($TiCl_4$), titanium sulfate [$Ti(SO_4)_2 \cdot mH_2O$, $0 \leq m \leq 20$], titanium oxysulfate [$TiOSO_4 \cdot nH_2O$, $0 \leq n < 20$], titanium oxychloride ($TiOCl_2$) and the like. Among them, titanium oxysulfate is preferably used. A titanium compound having a high purity is preferably used and a titanium compound having a purity of 99% by weight or higher is more preferably used. By using a titanium compound with a high purity, a minute particulate titanium oxide exhibiting a high photocatalytic activity may be obtained. The purity of the titanium compound may be measured by JIS K8401-1992 method in the case of titanium trichloride and by JIS K8460-1992 method in the case of titanium tetrachloride. In the case of titanium oxysulfate, the purity thereof may be calculated by measuring the contents of $TiO_2$ and $SO_3$ as main components and the contents of impurities such as $SiO_2$, $P_2O_5$ and $Nb_2O_5$ to obtain the purity in accordance with the following equation:

$$\text{Purity}(\%)=[(A_1+A_2)/(A_1+A_2+A_3+A_4+A_5+\ldots)]\times 100,$$

wherein $A_1$ and $A_2$ respectively represent the contents (% by weight) of $TiO_2$ and $SO_3$ and $A_3, A_4, A_5, \ldots$ respectively represent the contents (% by weight) of impurities such as $SiO_2$, $P_2O_5$ and $Nb_2O_5$.

One (the first production process) of the production processes in the present invention comprises a step of reacting a titanium compound with ammonia in an amount exceeding the stoichiometric amount necessary to convert the titanium compound to a titanium hydroxide prior to the calcining step.

In the case that the titanium compound is reacted with ammonia in an amount exceeding the stoichiometric amount necessary to convert the titanium compound to a titanium hydroxide, the stoichiometric amount is practically equivalent to the amount (by mole) of (B×C) times as much as the molar amount of titanium compound to be converted, the (B×C) being calculated by multiplying the number B of the acid radicals contained in one molecule of the titanium compound by the valence C of the acid radicals. The stoichiometric amount necessary to convert the titanium compound to a titanium hydroxide is the amount of, for example, 3 times (by mole) in the case of using titanium trichloride, 4 times (by mole) in the case of using titanium tetrachloride, 4 times (by mole) in the case of using titanium sulfate, 2 times (by mole) in the case of using titanium oxysulfate, and 2 times (by mole) in the case of titanium oxychloride as much as the molar amount of titanium compound to be converted. In the first production process, a titanium compound is reacted with ammonia in an amount exceeding the stoichiometric amount and the amount of ammonia may be that of about 1.2 times or more, preferably about 2 times or more as much as the stoichiometric amount, and abut 20 times or less, preferably about 10 times or less as much as the stoichiometric amount.

The reaction of a titanium compound with ammonia may be carried out at about 70° C. or lower. The temperature is preferably about 40° C. or lower and more preferably about −5° C. or lower. The reaction may be carried out in a process comprising the steps of placing a titanium compound in a reaction container, adding ammonia, e.g. ammonia solution (ammonia water) while stirring them and mixing them, in a process comprising the steps of placing ammonia in a reaction container, adding a titanium compound while stirring them and mixing them, or in a process comprising the steps of simultaneously placing a titanium compound and ammonia in a reaction container and mixing them.

Another one (the second production process) of the production processes in the present invention comprises a step of reacting a titanium compound with a base at pH of from about 2 to about 7 prior to the calcining step. In this process, the pH is the pH value of the mixed solution or slurry of the titanium compound and the base. The reaction may be carried out thoroughly (from the starting to the finishing) at pH of from about 2 to about 7.

For this reaction, any process of converting a titanium compound to a titanium hydroxide may be employed. The rection may be conducted in a process comprising the steps of placing an aqueous medium in a reaction container and then supplying an aqueous solution of a titanium compound and a base to the reaction container while stirring them or in a process comprising a step of continuously supplying an aqueous medium, a titanium compound and a base to a reaction tube. The yield of titanium hydroxide may be about 90% or higher and preferably about 95% or higher. The reaction may be carried out at pH of about 2 or higher and at pH of about 7 or lower. When the pH of the reaction is higher than about 7, the particle size of the resulting titanium oxide, which is obtained by calcining the reaction product of titanium compound with base, tends to be large. The pH of the reaction is preferably about 2.5 or higher, more preferably about 3 or higher and is preferably about 5.5 or lower, more preferably about 5 or lower.

Examples of the base to be reacted with the titanium compound at pH of from about 2 to about 7 include aqueous solutions of sodium hydroxide, potassium hydroxide, sodium carbonate, potassium carbonate or ammonia and besides them, the examples also include aqueous solutions of hydrazine, hydroxylamine, monoethanolamine, an acyclic amine compound, a cyclic aliphatic amine compound or the like. Among them, the aqueous solution of ammonia (ammonia solution) is preferably used. When a base is used in the form of an aqueous solution, the concentration of the base in the aqueous solution may be about 0.05% by weight or higher and about 50% by weight or lower.

The reaction of a titanium compound with a base at pH of from about 2 to about 7 may be carried out at about 5° C. or higher, preferably at about 20° C. or higher and may be carried out at about 90° C. or lower, preferably at about 70° C. or lower. When the reaction temperature is higher than about 90° C., the reaction between the titanium compound and the base may be locally proceeded and the reaction product may be unevenly produced so that the particle size of the finally obtained titanium oxide tends to become large.

The product obtained by the reaction at pH of from about 2 to about 7 is preferably subjected to aging thereafter by being further mixed with a base. The aging may be carried out in a process comprising a step of keeping the slurry containing the product in the presence of a base in a constant temperature range. For the aging, a base may be specially added to the slurry containing the product, the slurry being prepared by separating the product from a solution containing the resulting salt (e.g. ammonium sulfate or the like) produced by the reaction and then dispersing the product. By carrying out such aging for the product, the titanium oxide obtained after calcining the product may have a shape of minute particles and show an excellent photocatalytic activity under visible light radiation.

A base to be used for the reaction at pH of from about 2 to about 7 and a base to be used for the aging may or may not be the same kind of ones, and the contents of them in the solution (in the case of being added in a solution form) may or may not be the same. An example of a preferable base to be employed for aging is ammonia solution and the ammonia content of the ammonia solution may be about 0.05% by weight or higher and about 50% by weight or lower. The aging temperature may be about 0° C. or higher, preferably about 10° C. or higher, and may be about 110° C. or lower, preferably about 80° C. or lower. The period of time for aging is not limited and varies depending on a base content and an aging temperature. The period of time may be about 0.01 hour or longer, preferably about 0.5 hour or longer and may be within 60 hours, preferably within about 24 hours.

The total amount of a base to be used for the reaction at pH of from about 2 to about 7 and a base to be used for aging is preferably an amount exceeding the stoichiometric amount necessary to convert a titanium compound to a titanium hydroxide. Specifically, the total amount may be that of about 1.1 times by mole or more, preferably about 1.5 times by mole or more, and about 20 times by mole or less, preferably about 10 times by mole or less, as much as the stoichiometric amount. The larger the total amount of bases to be used is, the higher the photocatalytic activity of the finally obtained minute particulate titanium oxide tends to be. Nonetheless, when the amount exceeds a certain amount that extremely exceeds the stoichiometric amount, it may become difficult to obtain the photocatalytic activity corresponding to the amount.

The product obtained by reacting a titanium compound with ammonia in an amount exceeding the stoichiometric amount, the product obtained by reacting a titanium compound with a base at pH of from about 2 to about 7, or the product obtained by aging each of the products may be obtained in a slurry of a reaction mixture. The slurry containing the product may be used for the calcining step as it is or after the slurry is subjected to solid-liquid separation and the separated solid is washed if necessary. The separation may be carried out by pressure filtration, vacuum filtration, centrifugal separation, decantation or the like. Alternatively, the separation may be carried out by heating the slurry with a pneumatic conveying drying to evaporate the liquid therein.

The obtained slurry or the product recovered from the slurry by separation operation is then calcined. The calcination may be carried out at about 300° C. or higher, preferably at about 350° C. or higher, and may be carried out at about 600° C. or lower, preferably at about 500° C. or lower. When the calcining temperature is too high, the photocatalytic activity of the resulting titanium oxide may decrease. The calcination may be carried out in a pneumatic conveying furnace, a tunnel furnace, a rotary furnace or the like.

The titanium oxide obtained by the process of the present invention may have an anatase-type crystal structure. The titanium oxide exhibits a photocatalytic activity by radiation of ultraviolet light and/or visible light. The titanium oxide exhibiting an especially high photocatalytic activity by visible light radiation may be a titanium oxide which is obtained by a process comprising the steps of (i) reacting a titanium compound with ammonia in an amount exceeding the stoichiometric amount or reacting a titanium compound with a base at pH of from about 2 to about 7, to obtain a reaction product, (i)' adding an additional base to the product to conduct aging and (ii) calcining the product. The obtained titanium oxide may be used for a variety of applications such as for decomposing $NO_x$ in atmospheric air, for decomposing and removing malodorous substances and mold or for decomposing and removing an organic solvent in water, as it is or after a molding processing. In addition, the titanium oxide obtained after calcining the reaction product by reacting a titanium compound with a base at pH of about 2 to about 7 may be minute particles having an average particle size of about 20 $\mu$m or smaller and may be suitably utilized as a raw material for a coating material that is uniformly applied onto a substrate.

As described above, titanium oxide having a high photocatalytic activity can be easily obtained by the production process of the present invention. A minute particulate titanium oxide with the average particle size of about 20 μm or smaller and showing a photocatalytic activity can be also easily obtained. Further, by combining the aging step, a minute particulate titanium oxide having a more excellent in photocatalytic activity by the radiation of the visible light can easily be obtained.

The process for producing titanium oxide of the present invention is described in Japanese application nos. 2000-230779, filed on Jul. 31, 2000 and 2000-388333, filed on Dec. 21, 2000, the complete disclosures of which are incorporated herein by reference.

EXAMPLES

The present invention is described in more detail by following Examples, which should not be construed as a limitation upon the scope of the present invention. The measurements of an average particle size and a crystal structure of a titanium oxide and the evaluation of the catalytic activity thereof were carried out by the following methods.

Average Particle Size (μm)

A titanium oxide to be measured was dispersed in an aqueous sodium hexametaphosphate solution (0.2% by weight, produced by Wako Pure Chemical Industries, Ltd.), and then a 50 vol. % diameter of the titanium oxide was measured in the solution using a particle size distribution measuring apparatus (trade name: MICROTRAC HRA model 9320-X100, produced by Nikkiso Co., Ltd.). The obtained 50 vol. % diameter was referred to as an average particle size of the titanium oxide.

Crystal Structure

A crystal structure of titanium oxide was obtained using an X-ray diffraction meter (trade name: RAD-IIA, produced by Rigaku Denki Co., Ltd.).

Evaluation of Catalytic Activity

In a sealed-type glass reaction vessel (diameter: 8 cm, height: 10 cm, volume: about 0.5 L), was placed a 5-cm diameter glass Petri dish on which 0.3 g of sample titanium oxide. The reaction vessel was filled with a mixed gas having a volume ratio of oxygen to nitrogen of ¼ (i.e. oxygen:nitrogen=1:4), sealed with 13.4 μmol of acetaldehyde and then irradiated with visible light from outside of the vessel. The irradiation was carried out using a 500 W xenon lamp as the light source (made by USHIO INC., trade name; Optical Modulex SX-UI500XQ, lamp; UXL-500SX) equipped with an ultraviolet cutting filter (made by Asahi Techno-Glass Co., Ltd., of which former name is Toshiba Glass Co., Ltd., trade name: Y-45) cutting off ultraviolet light having a wavelength of about 430 nm or shorter and an infrared cutting filter (made by USHIO INC., trade name: Supercold Filter) cutting off infrared light having a wavelength of about 830 nm or longer. When acetaldehyde is decomposed by visible light irradiation, carbon dioxide is generated due to the photocatalytic activity of the titanium oxide. The generated carbon dioxide concentration was measured with passage of time using a photoacoustic multigas monitor (type: 1312, made by INNOVA). Using the change of carbon dioxide concentration, the generation rate of carbon dioxide was calculated to evaluate a photocatalytic activity of the titanium oxide for acetaldehyde. A higher generation rate of carbon dioxide reveals a higher photocatalytic activity of the titanium oxide for acetaldehyde.

Example 1

Into 1-L flask, was poured 40 g of water. Then, 60 g of a hydrated titanium oxysulfate (produced by SOEKAWA CHEMICAL Co., Ltd.) (purity: 99.93%, $SiO_2$ content: 0.011% by weight, $P_2O_5$ content: 0.034% by weight, $Nb_2O_5$ content:0.03% by weight) was added thereto while stirring and dissolved therein. The resulting solution was concentrated by removing water with an evaporator at 70° C. to obtain a titanium oxysulfate. On the other hand, 270 g of 25% ammonia solution (ammonia water) (special grade, produced by Wako Pure Chemical Industries, Ltd.) was diluted with 180 g of water to prepare 15% ammonia solution. The 15% ammonia solution was cooled in a cooling tank at −30° C. and then the obtained titanium oxysulfate was added thereto while stirring at 400 rpm and mixed to cause a reaction and obtain a slurry. (The amount of ammonia utilized at that time was equivalent to that of 8 times by mole as much as the stoichiometric amount of the ammonia necessary to convert the titanium oxysulfate to a titanium hydroxide.) The obtained slurry was filtered to obtain a titanium hydroxide, and the obtained titanium hydroxide was washed and dried. After that, the obtained titanium hydroxide was calcined for 1 hour in air at 400° C. to obtain a particulate titanium oxide.

The photocatalytic activity of the obtained titanium oxide for acetaldehyde was measured. As a result, a generation rate of carbon dioxide per 1 g of titanium oxide was 189.9 μmol/h.

Example 2

Into 1-L flask, was poured 100 g of water. Then, 60 g of the same grade of hydrated titanium oxysulfate (produced by SOEKAWA CHEMICAL Co., Ltd.) as utilized in Example 1 was added thereto while stirring and dissolved therein. The resulting solution was concentrated by removing water with an evaporator at 70° C. to obtain a titanium oxysulfate. In a cooling tank at −30° C., 68 g of 25% ammonia solution (special grade, produced by Wako Pure Chemical Industries, Ltd.) was cooled and then the obtained titanium oxysulfate was added thereto while stirring at 400 rpm and mixed to cause a reaction and obtain a slurry. (The amount of ammonia utilized at that time was equivalent to that of 2 times by mole as much as the stoichiometric amount of the ammonia necessary to convert the titanium oxysulfate to a titanium hydroxide.) The obtained slurry was filtered to obtain a titanium hydroxide, and the obtained titanium hydroxide was washed and dried. After that, the obtained titanium hydroxide was calcined for 1 hour in air at 400° C. to obtain a particulate titanium oxide.

The photocatalytic activity of the obtained titanium oxide for acetaldehyde was measured. As a result, a generation rate of carbon dioxide per 1 g of titanium oxide was 93.88 μmol/h.

Example 3

In 68 g of water, was dissolved 102 g of the same grade of hydrated titanium oxysulfate as utilized in Example 1 to prepare an aqueous titanium oxysulfate solution having pH of about 1.

Water in the amount of 300 g was put in a 1-L flask equipped with a pH electrode and a pH controller connected to the pH electrode so as to keep the pH therein constant by supplying 25% by weight of ammonia solution (special grade, produced by Wako Pure Chemical Industries, Ltd.). The pH of the pH controller was set to be 4 and the pH of the water in the flask was adjusted to the set pH value. With stirring at 400 rpm, 170 g of the aqueous titanium oxysulfate solution prepared in the above-described manner was added at 5 ml/min to the flask and reacted with ammonia solution supplied to the flask, while the pH of the resulting slurry provided by the reaction therein being controlled by the pH controller. The amount of 58 g of the 25 wt. % ammonia solution was supplied to the flask until the aqueous titanium oxysulfate solution was completely added. For a period of 1 minute after adding the aqueous titanium oxysulfate solution, the pH of the slurry in the flask was in the range of from 3.6 to 4.6. From 5 minutes after the starting of the addition to the finishing thereof, the pH of the slurry was pH 3.9 to 4.0. The temperature of the slurry was 24° C. at the time of starting the addition of the aqueous titanium oxysulfate and 40° C. at the time of finishing the addition.

The slurry obtained above was kept for 1 hour while stirring and then 56 g of ammonia solution (25% by weight, produced by Wako Pure Chemical Industries, Ltd.) was added thereto. The slurry was kept for another 1 hour while stirring to conduct aging of the reaction product contained in the slurry. While aging, the temperature of the slurry was constant at 30° C. (The total amount of ammonia in the ammonia solution supplied to the flask was 114 g, which was equivalent to that of 2 times by mole as much as the stoichiometric amount necessary to convert the titanium oxysulfate to the titanium hydroxide.)

The slurry containing the reaction product obtained after aging was filtered, washed and dried. After that, the dried product was calcined for 1 hour in air at 400° C. to obtain a particulate titanium oxide. The titanium oxide had an average particle size of 3.5 $\mu$m and anatase-type crystal structure.

The photocatalytic activity of the obtained titanium oxide for acetaldehyde was measured. As a result, a generation rate of carbon dioxide per 1 g of titanium oxide was 20.93 $\mu$mol/h.

Example 4

In 408 g of water, was dissolved 102 g of the same grade of hydrated titanium oxysulfate as utilized in Example 1 to prepare an aqueous titanium oxysulfate solution having pH of about 1.

Water in the amount of 300 g was put in a 1-L flask equipped with a pH electrode and a pH controller connected to the pH electrode so as to keep the pH therein constant by supplying 25% by weight of ammonia solution (special grade, produced by Wako Pure Chemical Industries, Ltd.). The pH of the pH controller was set to be 4 and the pH of the water in the flask was adjusted to the set pH value. With stirring at 400 rpm, 510 g of the aqueous titanium oxysulfate solution prepared in the above-described manner was added at 5 ml/min to the flask and reacted with ammonia solution supplied to the flask, while the pH of the resulting slurry provided by the reaction therein being controlled by the pH controller. The amount of 58 g of the 25 wt. % ammonia solution was supplied to the flask until the aqueous titanium oxysulfate solution was completely added. (The amount of ammonia in the 58 g ammonia solution was equivalent to 1 time by mole as much as the stoichiometric amount necessary to convert the titanium oxysulfate to a titanium hydroxide.) For a period of 1 minute after adding the aqueous titanium oxysulfate solution, the pH of the slurry in the flask was in the range of from 2.7 to 6.4. From 20 minutes after the starting of the addition to the finishing thereof, the pH of the slurry was pH 3.9 to 4.1. The temperature of the slurry was 24° C. at the time of starting the addition of the aqueous titanium oxysulfate and 33° C. at the time of finishing the addition.

The slurry containing the product provided by the above reaction was filtered, washed and dried. After that, the dried product was calcined for 1 hour in air at 400° C., washed again and dried to obtain a particulate titanium oxide. The titanium oxide had an average particle size of 3.5 $\mu$m and anatase-type crystal structure.

The photocatalytic activity of the obtained titanium oxide for acetaldehyde was measured. As a result, a generation rate of carbon dioxide per 1 g of titanium oxide was 2.76 $\mu$mol/h.

Comparative Example 1

In 408 g of water in a 1-L flask, was dissolved 102 g of the same grade of hydrated titanium oxysulfate as utilized in Example 1 to prepare an aqueous titanium oxysulfate solution. With stirring at 400 rpm, 58 g of an ammonia solution (25% by weight, produced by Wako Pure Chemical Industries, Ltd.) was supplied thereto at 5 ml/min and reacted with the aqueous titanium oxysulfate solution. (The amount of ammonia in the 58 g ammonia solution was equivalent to 1 time by mole as much as the stoichiometric amount necessary to convert the titanium oxysulfate to a titanium hydroxide.) For a period of 1 minute after adding the ammonia solution, the pH of the resulting slurry in the flask was 0.7. At the finishing of the addition of the ammonia solution, the pH of the slurry was 4.0. The temperature of the slurry was 62° C. at the time of starting the addition of the ammonia solution and then 65° C. at the time of finishing the addition.

The slurry was filtered, washed and dried. After that, the dried product was calcined for 1 hour in air at 400° C. to obtain a particulate titanium oxide. The titanium oxide had an average particle size of 41.8 $\mu$m.

The photocatalytic activity of the obtained titanium oxide for acetaldehyde was measured. As a result, a generation rate of carbon dioxide per 1 g of titanium oxide was 0 $\mu$mol/h.

What is claimed is:

1. A process for producing a titanium oxide which comprises the steps of
    (i) reacting a titanium compound with ammonia, wherein the reaction is carried out at a temperature of about 40° C. or lower and the amount of ammonia exceeds the stoichiometric amount necessary to convert the titanium compound to a titanium hydroxide or
    reacting a titanium compound with a base, while maintaining pH in the range of from about 2 to about 7,
    to obtain a reaction product and
    (ii) calcining the reaction product of step (i) at a temperature of about 600° C. or lower.

2. A process for producing a titanium oxide according to claim 1, which further comprises a step (i)' of adding a base to the reaction product to conduct aging prior to the calcination step.

3. A process for producing a titanium oxide according to claim 2, wherein the total amount of base or ammonia used for the reaction in step (i) and the base used for aging in step (i)' is an amount exceeding the stoichiometric amount necessary to convert the titanium compound to the titanium hydroxide.

4. A process for producing a titanium oxide according to claim 2 or 3, wherein ammonia is used for both the reaction step (i) and the aging step (i)'.

5. A process for producing titanium oxide according to claim 3, wherein the total amount of base used for aging is about 1.5 times by mole to about 10 times by mole of the stoichiometric amount necessary to convert the titanium compound to titanium hydroxide.

6. A process for producing a titanium oxide according to claim 1, wherein the total amount of ammonia to convert the titanium compound to titanium hydroxide is 1.2 times by mole or more of the stoichiometric amount necessary to convert the titanium compound to titanium hydroxide.

7. A process for producing a titanium oxide according to claim 1, wherein the total amount of ammonia to convert the titanium compound to titanium hydroxide is about 2.0 times by mole or more of the stoichiometric amount necessary to convert the titanium compound to titanium hydroxide.

8. A process for producing a titanium oxide according to claim 1, wherein the total amount of ammonia to convert a titanium compound to a titanium hydroxide is about 2.0 times by mole to about 20 times by mole of the stoichiometric amount necessary to convert the titanium compound to titanium hydroxide.

9. A process for producing a titanium oxide according to claim 1, wherein the total amount of ammonia to convert a titanium compound to a titanium hydroxide is about 2.0 times by mole to about 10 times by mole the stoichiometric amount necessary to convert the titanium compound to titanium hydroxide.

10. The process for producing a titanium oxide according to claim 1, wherein the pH of the reaction is maintained in the range of from about 2.5 to about 7.

11. The process for producing a titanium oxide according to claim 1, wherein the pH of the reaction is maintained in the range of from 3.0 to about 7.

12. The process for producing a titanium according to claim 1, wherein the pH of the reaction is maintained in the range of from 3.0 to 5.0.

13. The process for producing a titanium according to claim 1, wherein the pH of the reaction is maintained in the range of from 3.0 to 5.5.

14. The process for producing a titanium oxide according to claim 1, wherein the reaction in step (i) is carried out at a temperature of about 40° C. or lower.

15. The process for producing a titanium oxide according to claim 1, wherein the reaction in step (i) is carried out at a temperature of about −5° C. or lower.

16. A process for producing titanium oxide according to claim 3, wherein the total amount of base used for aging is about 1.1 times by mole or more of the stoichiometric amount necessary to convert the titanium compound to titanium hydroxide.

17. A process for producing titanium oxide according to claim 3, wherein the total amount of base used for aging is about 1.5 times by mole or more of the stoichiometric amount necessary to convert the titanium compound to titanium hydroxide.

18. A process for producing titanium oxide according to claim 3, wherein the total amount of base used for aging is about 1.5 times by mole to about 20 times by mole of the stoichiometric amount necessary to convert the titanium compound to titanium hydroxide.

* * * * *